(12) United States Patent
Grzeslak et al.

(10) Patent No.: US 9,906,742 B2
(45) Date of Patent: Feb. 27, 2018

(54) METHOD AND SYSTEM FOR UV INOPERABLE PIXEL COMPENSATION

(71) Applicant: BAE SYSTEMS Information & Electronic Systems Integration Inc., Nashua, NH (US)

(72) Inventors: Kazimierz T Grzeslak, Bedford, NH (US); Stephen M Dolfini, Brookline, NH (US); Kurt J Nordhaus, Pepperell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 235 days.

(21) Appl. No.: 14/804,746

(22) Filed: Jul. 21, 2015

(65) Prior Publication Data

US 2016/0028979 A1 Jan. 28, 2016

Related U.S. Application Data

(60) Provisional application No. 62/027,467, filed on Jul. 22, 2014.

(51) Int. Cl.
| | | |
|---|---|---|
| *H04N 5/00* | (2011.01) | |
| *H04N 5/367* | (2011.01) | |
| *G06T 5/20* | (2006.01) | |
| *H04N 5/32* | (2006.01) | |
| *G06T 5/00* | (2006.01) | |

(52) U.S. Cl.
CPC .......... *H04N 5/3675* (2013.01); *G06T 5/005* (2013.01); *G06T 5/20* (2013.01); *H04N 5/32* (2013.01); *G06T 2207/20032* (2013.01)

(58) Field of Classification Search
CPC ........ G06K 9/00; H04N 5/217; H04N 17/002; G06T 1/20
See application file for complete search history.

(56) References Cited

U.S. PATENT DOCUMENTS

| | | | | |
|---|---|---|---|---|
| 5,832,055 A | * | 11/1998 | Dewaele | ................. G06T 5/005 250/587 |
| 7,095,039 B2 | * | 8/2006 | Murakoshi | ........... G01N 23/046 250/580 |
| 7,313,288 B2 | * | 12/2007 | Dierickx | ................ H04N 5/367 348/E5.081 |

(Continued)

OTHER PUBLICATIONS

Li Guike, Feng Peng, Wu Nanjian, A novel monolithic ultraviolet image sensor based on a standard CMOS process, Journal of Semiconductors, Oct. 2011, vol. 32, No. 10.

(Continued)

*Primary Examiner* — Frank Huang
(74) *Attorney, Agent, or Firm* — Maine Cernota & Rardin; Scott J. Asmus (57) ABSTRACT

A method for estimating values lost to inoperable pixels on ultraviolet (UV) sensor arrays comprising identifying an inoperable pixel on a UV sensor array, applying a three by three kernel to the inoperable pixel, the three by three kernel being centered on the inoperable pixel, acquiring a centroid value for the inoperable pixel, applying a compensation algorithm based on the three by three kernel radial centroid value, and calculating estimated values for the inoperable pixel.

18 Claims, 9 Drawing Sheets

KERNEL CENTERED ON A UV SOURCE (56) References Cited

U.S. PATENT DOCUMENTS

| | | | | |
|---|---|---|---|---|
| 7,474,308 B2* | 1/2009 | Deering | ............... | G06T 11/001 |
| | | | | 345/419 |
| 7,646,908 B2* | 1/2010 | Onishi | ................... | G06T 7/001 |
| | | | | 382/149 |
| 8,135,237 B2* | 3/2012 | Quan | ................... | G06T 3/4015 |
| | | | | 348/538 |
| 8,625,005 B2* | 1/2014 | Palik | ........................ | G06T 5/50 |
| | | | | 348/222.1 |
| 8,742,311 B2* | 6/2014 | Manabe | ........... | H01L 27/14612 |
| | | | | 250/208.1 |
| 8,953,882 B2* | 2/2015 | Lim | ........................ | G06T 1/20 |
| | | | | 348/241 |

OTHER PUBLICATIONS

Charles L. Joseph, UV Image Sensors and Associated Technologies, Experimental Astronomy, Jan. 1995, vol. 6, Issue 1, pp. 97-127.

\* cited by examiner

SIMPLIFIED SENSOR ARRAY
FIG. 1

KERNEL CENTERED ON A UV SOURCE
FIG. 2

KERNEL PARTIALLY CENTERED ON A UV SOURCE
FIG. 3

KERNEL CENTERED OUTSIDE OF A UV SOURCE
FIG. 4

UV SENSOR ARRAY WITH A NUMBER OF INOPERABLE PIXELS
FIG. 5

COMPENSATION ALGORITHM
FIG. 6

700

MaxCrn = Max( Avg(Crn1); Avg(Crn2); Avg(Crn3); Avg(Crn4))

MaxCrn FUNCTION
FIG. 7

800

MSLP FUNCTION
FIG. 8

METHOD FLOW CHART
FIG. 9

METHOD AND SYSTEM FOR UV INOPERABLE PIXEL COMPENSATION

RELATED APPLICATIONS

This application claims the benefit of U.S. Provisional Application No. 62/027,467, filed 22 Jul. 2014. This application is herein incorporated by reference in its entirety for all purposes.

STATEMENT OF GOVERNMENT INTEREST

This invention was made with United States Government support under Contract No. W15P7T-06-D-E402 0113 awarded by the US Army. The United States Government has certain rights in this invention.

FIELD OF THE INVENTION

The invention relates to ultraviolet (UV) sensor arrays, and more specifically, to a method and system for correcting dead or stuck pixels therein.

BACKGROUND OF THE INVENTION

During the manufacturing of UV sensor arrays, some pixels are classified as dead or stuck. Dead or stuck pixels are inoperable, not producing a value for the incident radiation. Inoperable pixels significantly reduce the performance of a UV sensor array. Existing solutions are mostly applicable to imaging sensors, and are designed to produce good looking results. Current solutions include the estimation of an inoperable pixel value with zero, or with an average of the next nearest neighbors as performed in commercially available visible sensor arrays.

What is needed, therefore, are techniques for more accurate replacement values for inoperable pixels of UV sensor arrays.

SUMMARY OF THE INVENTION

An embodiment provides a method for estimating values lost to inoperable pixels on an ultraviolet (UV) sensor array, the method comprising identifying one inoperable pixel on the UV sensor array having pixels; applying a kernel to the inoperable pixel; acquiring a centroid value for the inoperable pixel; applying a compensation algorithm to the kernel; calculating estimated values for the inoperable pixel; and outputting the estimated value for the inoperable pixel with the output of the UV sensor array. In embodiments the compensation algorithm filter is based on the centroid value wherein the Centroid value equals a square root of ((CentroidX multiplied by CentroidX) plus (CentroidY multiplied by CentroidY)); where CentroidX equals (a sum of (A13; A23; A33) minus a sum of (A11; A21; A31)) divided by a sum of (A13; A23; A33; A11; A21; A31); and where CentroidY equals (a sum of (A11; A12; A13) minus a sum of (A31; A32; A33)) divided by a sum of (A11; A12; A13; A31; A32; A33). In other embodiments, dimensions of the kernel are three by three. In subsequent embodiments the kernel is centered on the inoperable pixel. Additional embodiments comprise eight centroid value ranges. In another embodiment, the eight centroid value ranges are about 0 to about 0.1755; about 0.1755 to about 0.2351; about 0.2351 to about 0.4534; about 0.4534 to about 0.6164; about 0.6164 to about 0.7637; about 0.7637 to about 0.8829; about 0.8829 to about 0.9740; and greater than about 0.9740. For a following embodiment the compensation algorithm comprises guard peak; median filter; max kernel slope; max kernel slope*1.2; max kernel slope*0.75; max kernel slope*0.5; max kernel slope*0.3; and max corner. In subsequent embodiments the guard peak comprises selecting a largest value out of eight pixels in the Kernel inoperable pixel comprising (Maximum of (A11, A12, A13, A21, A23, A31, A32, A33)). In additional embodiments the Median filter comprises calculating a median value out of eight pixels in the Kernel comprising (Median of (A11, A12, A13, A21, A23, A31, A32, A33)). In included embodiments the Max kernel Slope (MSLP) Filter selects a largest of an opposite kernel's pixel sums and applies half of a selected value as a result, wherein (MSLP equals one half times a Maximum of (A11+A33; A12+A32; A13+A31; A21+A23)). In yet further embodiments the Max Corner (MaxCrn) equals a maximum of an average of each corner pixel and each corner pixel's two adjacent pixels of the kernel, where MaxCrn equals Maximum of ((A21+A31+A32) divided by three; (A21+A11+A12) divided by three; (A12+A13+A23) divided by three; (A23+A33+A32) divided by three). In related embodiments the kernel comprises eight pixels surrounding an inoperable pixel. For further embodiments, a value of the inoperable pixel is replaced with a value of zero if the kernel is positioned over pure noise, regardless of the centroid value. In ensuing embodiments the step of applying a compensation algorithm comprises applying a Guard Peak function multiplied by 1.1 to the kernel if the centroid value is between 0-0.1755; applying a Max(Corner) function to the kernel if the centroid value is between 0.1755-0.2351; applying a Max Kernel Slope (MSLP) function multiplied by 1.2 to the kernel if the centroid value is between 0.2351-0.4534; applying the MSLP function to the kernel if the centroid value is between 0.4534-0.6164; applying the MSLP multiplied by 0.75 to the kernel if the centroid value is between 0.6164-0.7637; applying the MSLP multiplied by 0.5 to the kernel if the centroid value is between 0.7637-0.8829; applying MSLP multiplied by 0.3 to the kernel if the centroid value is between 0.8829-0.9740; and applying a Median Filter to the kernel if the centroid value is greater than 0.9740.

Another embodiment provides a system for estimating values lost to inoperable pixels on an ultraviolet (UV) sensor array comprising identifying at least one inoperable pixel on the UV sensor array; applying a kernel to one of the at least one inoperable pixels; acquiring a centroid value for the one inoperable pixel; applying a compensation algorithm to the kernel; calculating an estimated value for the one inoperable pixel; repeating the steps for subsequent inoperable pixels; and outputting the estimated value for the inoperable pixels with output of the UV sensor array, whereby added noise is reduced by a factor of four and random sources are prevented from appearing in output of the array. For yet further embodiments, the kernel comprises a three by three block of eight pixels surrounding the inoperable pixel. For more embodiments, the kernel is centered on the inoperable pixel. For continued embodiments a value of the inoperable pixel is replaced with a value of zero if the kernel is positioned over pure noise, regardless of the centroid value. For additional embodiments, the compensation algorithm filter selection is based on one of eight centroid value ranges.

A yet further embodiment provides an ultraviolet (UV) sensor array system for estimating values lost to inoperable pixels comprising identifying one inoperable pixel on the UV sensor array having pixels; applying a 3×3 kernel to the inoperable pixel, the 3×3 kernel being centered on the inoperable pixel; acquiring a centroid value for the inoperable pixel; applying a compensation algorithm to the kernel, the compensation algorithm comprising applying a Guard Peak function multiplied by 1.1 to the kernel if the centroid value is between 0-0.1755; applying a Max(Corner) function to the kernel if the centroid value is between 0.1755-0.2351, wherein MaxCrn function equals a maximum of an average of each corner pixel and each corner pixels two adjacent pixels of the kernel; applying a Max Kernel Slope (MSLP) function multiplied by 1.2 to the kernel if the centroid value is between 0.2351-0.4534, wherein the MSLP function equals half of a maximum value of a sum of pixels and their opposites along the kernel; applying the MSLP function to the kernel if the centroid value is between 0.4534-0.6164; applying the MSLP multiplied by 0.75 to the kernel if the centroid value is between 0.6164-0.7637; applying the MSLP multiplied by 0.5 to the kernel if the centroid value is between 0.7637-0.8829; applying MSLP multiplied by 0.3 to the kernel if the centroid value is between 0.8829-0.9740; and applying a Median Filter to the kernel if the centroid value is greater than 0.9740; calculating estimated values for the inoperable pixel; and outputting the estimated value for the inoperable pixel with output of the UV sensor array, whereby noise is reduced by a factor of four and random sources are prevented from appearing in output of the array.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention compensates for inoperable pixels by calculating replacement values for the inoperable pixels, while minimizing unwanted effects on the final image. The present solution employs some knowledge of the source characteristics or the UV signature to evaluate the missing values. One of the characteristics of the source is that it represents a point source with a pixel extent defined by the optical point spreading function of the lens and/or the optical scattering function of the atmosphere. The present solution reduces noise by a factor of four and prevents random sources from appearing real in the array. The present solution utilizes a compensation algorithm. Embodiments of the compensation algorithm employ a gradient peak, corner, and median filters based on the centroid value of a 3×3 pixel kernel centered on an indicated inoperable pixel.

Figure 1:
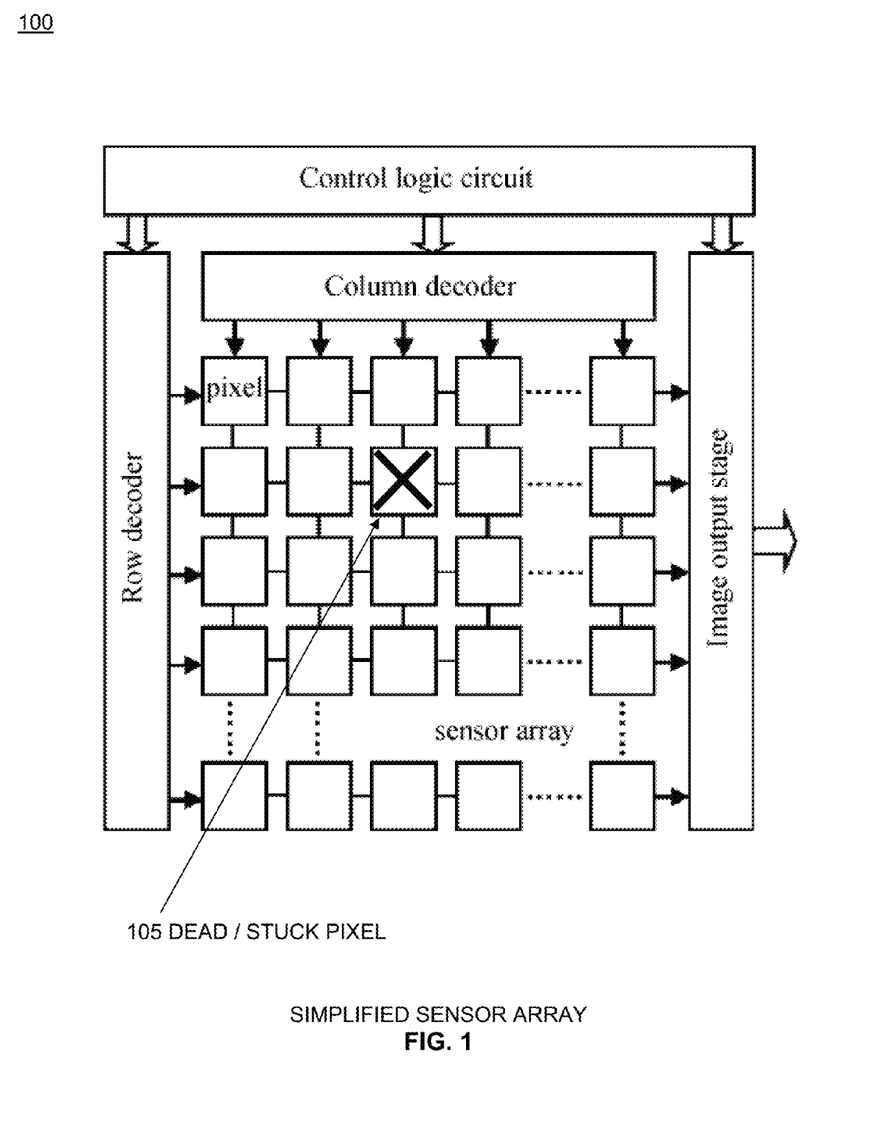
FIG. 1 is a depiction of a simplified sensor array configured in accordance with one embodiment of the present invention.

FIG. 1 is a depiction of a simplified sensor array 100. Components comprise a dead/stuck pixel 105, other pixels of the sensor array; a row decoder; a column decoder; and an image output stage.

Figure 2:
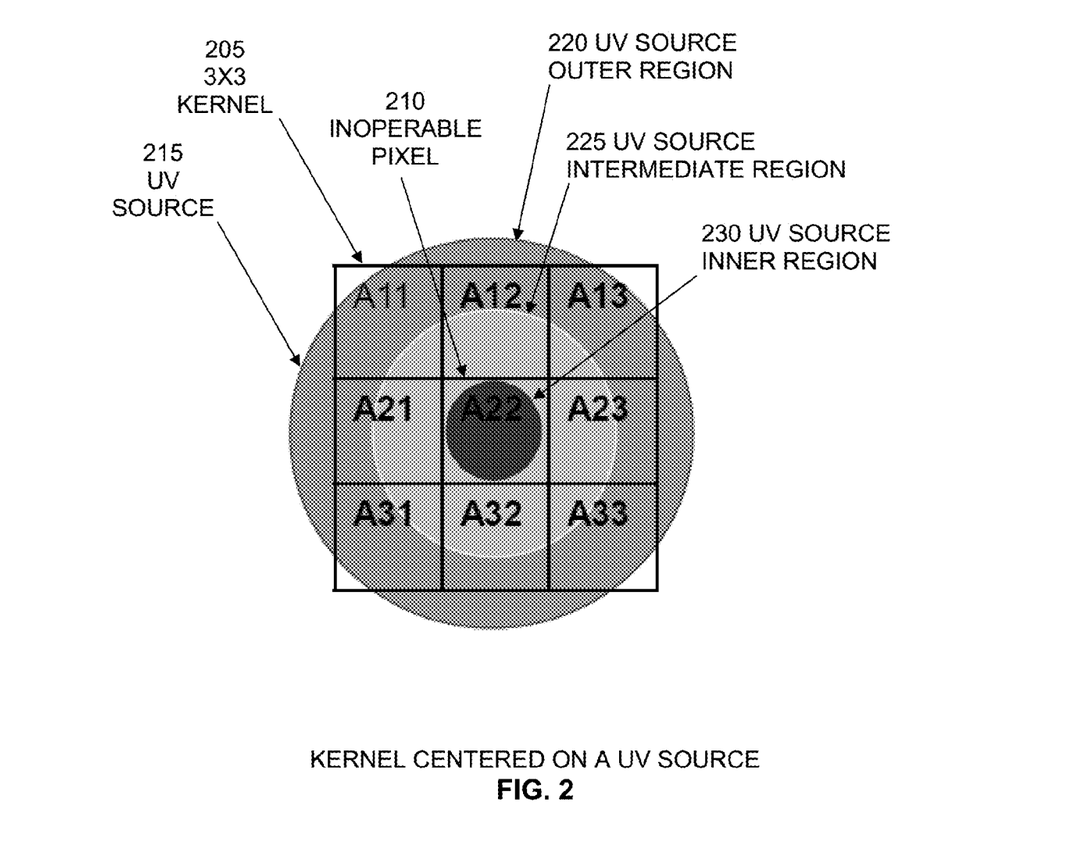
FIG. 2 is depiction of the Kernel centered on a UV source configured in accordance with one embodiment of the present invention.
Figure 3:
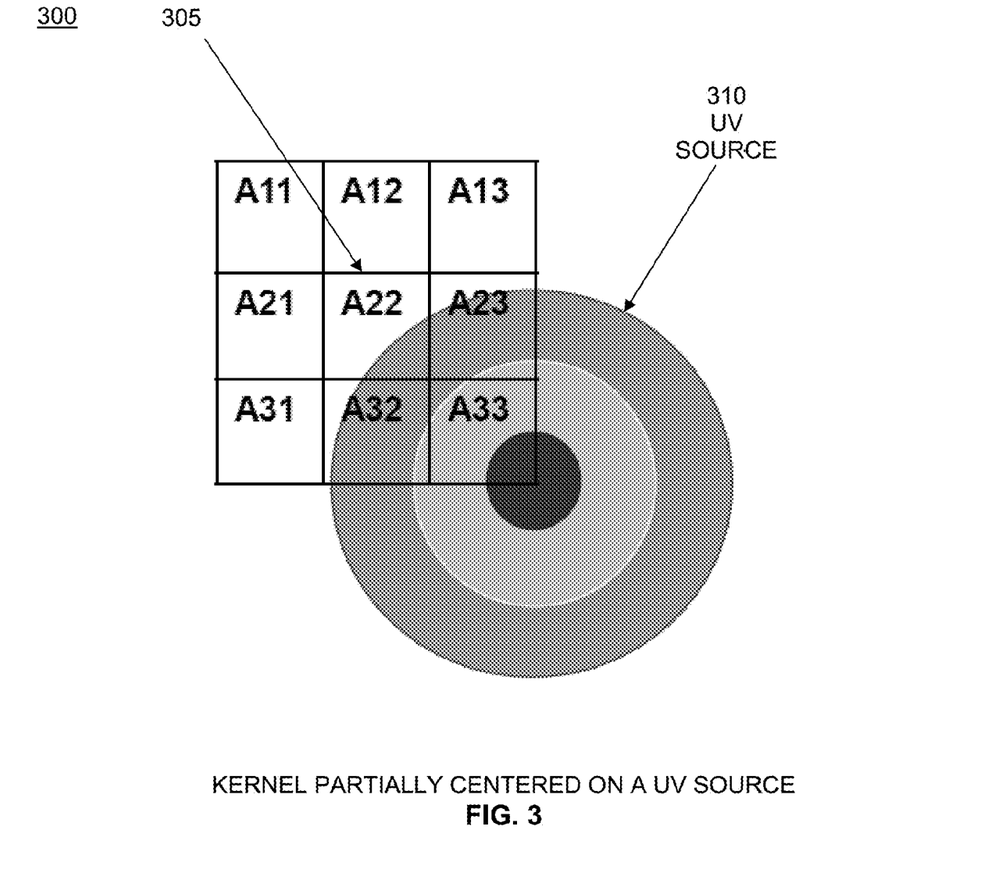
FIG. 3 is a depiction of the Kernel partially centered on a UV source configured in accordance with one embodiment of the present invention.
Figure 4:
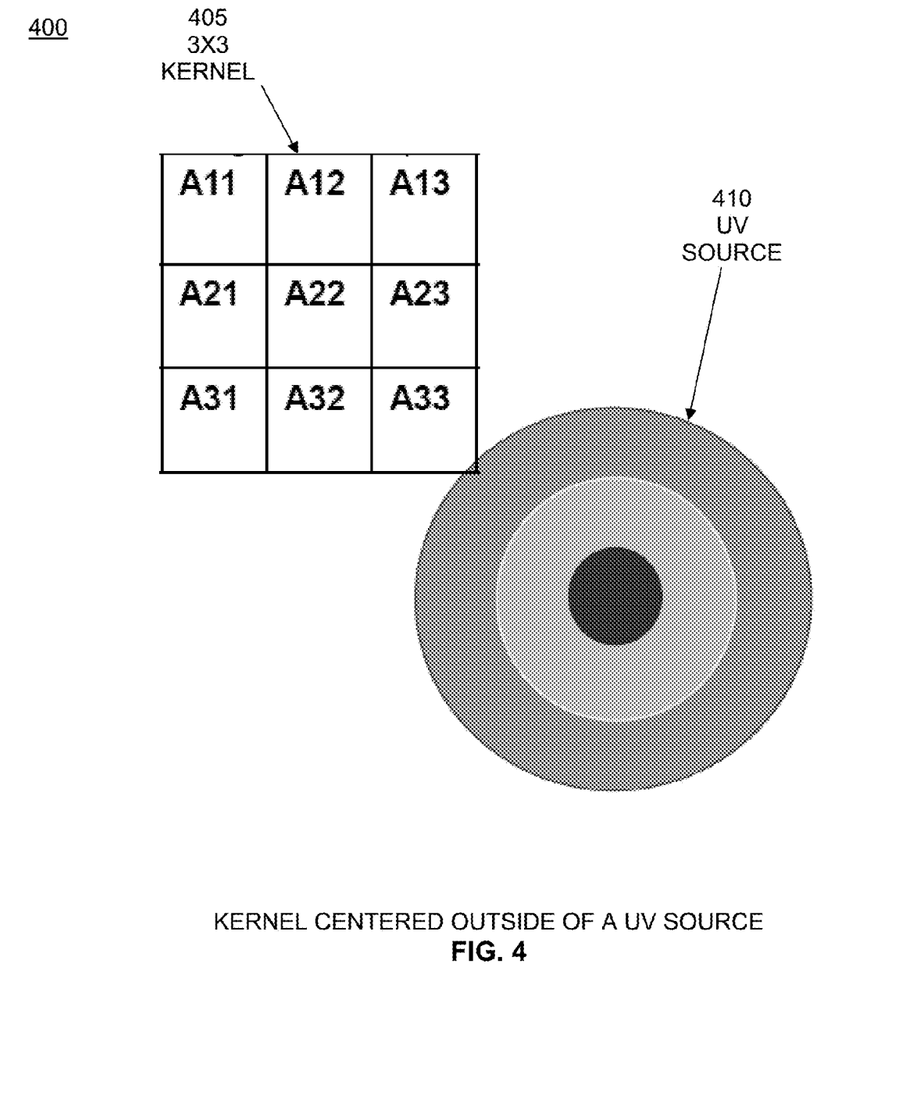
FIG. 4 is a depiction of the Kernel centered outside of a UV source configured in accordance with one embodiment of the present invention.

FIGS. 2-4 depict an array (kernel) created around an inoperable pixel (pixel A22 of the kernel) shown in three alignments with the UV source. As seen in the Figures, the array kernels are composed in a 3×3 configuration. The total array kernel comprises eight pixels surrounding an inoperable pixel. A UV source produces a value on each operable kernel pixel. The value of each kernel pixel depends on radiation from the UV source, and as such creates a surface composed of pixel values. These surface values may be used to determine where the UV source is located in relation to the kernel array.

FIG. 2 depicts the Kernel and the inoperable pixel (pixel A22) collocated and centered with a UV source for the first alignment 200. The array kernel is composed in a 3×3 configuration 205. The total array Kernel comprises eight pixels surrounding an inoperable pixel 210. UV source 215 produces a value on the kernel pixels. UV source 215 is depicted as having three regions—an outer region 220; an intermediate region 225; and an inner region 230.

FIG. 3 depicts the Kernel centered on an inoperable pixel (pixel A22) 305 and a UV source 310 located in one of the kernel's corners for the second alignment 300.

FIG. 4 depicts the Kernel centered on an inoperable pixel (pixel A22) and a UV source located outside of the area covered by the Kernel for the third alignment 400. A UV source 410 is centered outside of the Kernel 405.

In determining an estimated value of the inoperable pixel, various filters are used. The following is a nonlimiting list of filters used in embodiments: guard peak, median filter, max kernel slope, max kernel slope*1.2, max kernel slope*0.75, max kernel slope*0.5, max kernel slope*0.3, and max corner. Max kernel slope is calculated by taking half of the maximum value of the sum of pixels and their opposites along the array. Max Corner is the maximum of the average of each corner pixel and each corner pixels two adjacent pixels. The filter used is determined by the centroid value.

Figure 5:
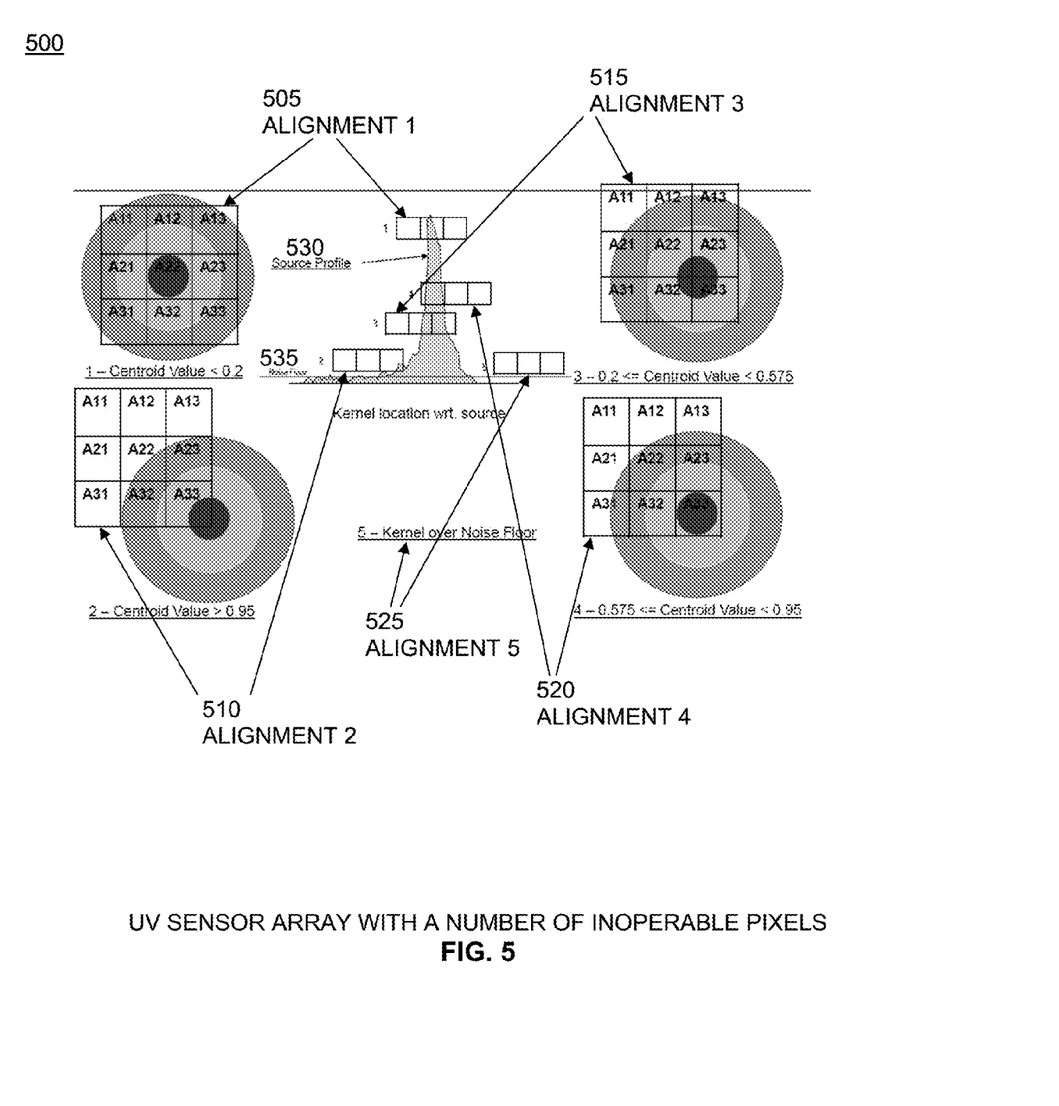
FIG. 5 is a depiction of a UV sensor array with a number of inoperable pixels undergoing an extended median filter with gradient filter configured in accordance with one embodiment of the present invention.

FIG. 5 depicts various Kernel locations with respect to the typical UV source spatial profile side view 530. Five locations of the UV source over the Kernel, having different centroid values, are shown. Location 1 505 with UV source inner region over pixel A22 has a centroid value of less than 0.2. Alignment 2 510 with UV source inner region partially over pixel A33 has a centroid value of greater than 0.95. Alignment 3 515 with UV source inner region partially over pixels A22, A23, A32, and A33 has a centroid value of greater than or equal to 0.2 and less than 0.575. Alignment 4 520 with UV source inner region centered over pixel A33 has a centroid value of greater than or equal to 0.575 and less than 0.95. In alignment 5 525, the UV source extent is outside the Kernel and the Kernel is located over the noise floor. Part of the source profile 530 depicts noise floor 535.

Figure 6:
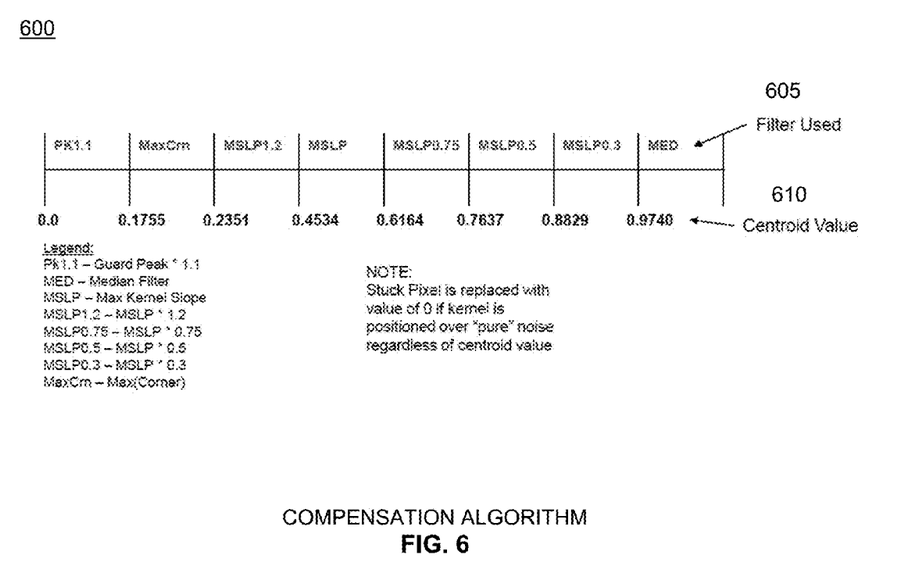
FIG. 6 is a depiction of an embodiment of the compensation algorithm configured in accordance with the present invention.

FIG. 6 depicts an embodiment of compensation algorithm 600. Filter type used 605 is designated as a function of the centroid value 610 between zero and one. For centroid values 0-0.1755, Guard Peak*1.1 (Pk1.1) filter is used, for centroid values 0.1755-0.2351, Max Corner (MaxCrn) is used, for centroid values 0.2351-0.4534 Max Kernel Slope (MSLP) is used, for centroid values 0.4534-0.6164 Max Kernel Slope*1.2 (MSLP1.2) is used, for centroid values 0.6164-0.7637 Max Kernel Slope*0.75 (MSLP0.75) is used, for centroid values 0.7637-0.8829 Max Kernel Slope*0.5 (MSLP0.5) is used, for centroid values 0.8829-0.9740 Max Kernel Slope*0.3 (MSLP0.3) is used, and for centroid values greater than 0.9740 Median Filter (MED) is used. A stuck pixel is replaced with a value of zero if the Kernel is positioned over "pure" noise, regardless of the centroid value.

Figure 7:
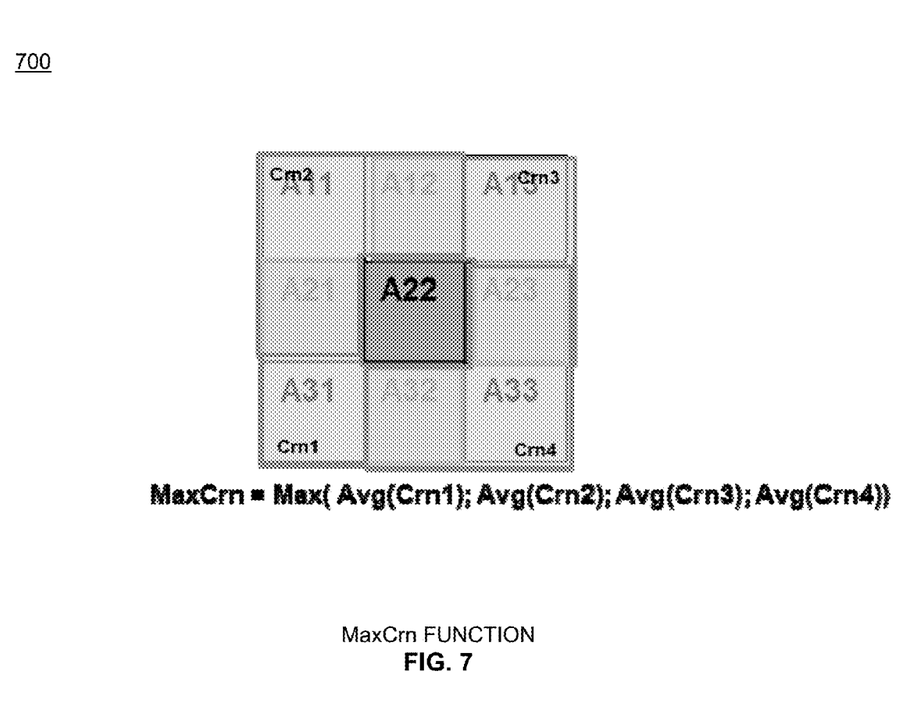
FIG. 7 is a description of a MaxCrn function used by the algorithm configured in accordance with one embodiment of the present invention.

FIG. 7 is a description of a MaxCrn function 700 used by embodiments of the algorithm. Specifically, Max Corner (MaxCrn)=Maximum (Average(Crn1); Average(Crn2); Average(Crn3); Average(Crn4)).

Figure 8:
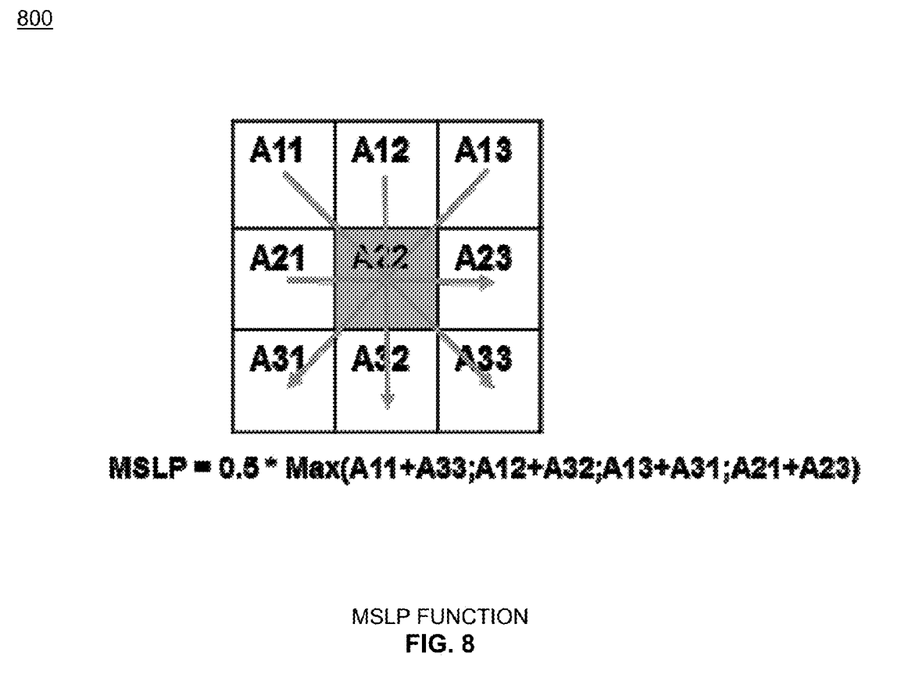
FIG. 8 is a description of a MSLP function used by the algorithm configured in accordance with one embodiment of the present invention.

FIG. 8 is a description of a MSLP function 800 used by embodiments of the algorithm. Specifically, Max Kernel Slope (MSLP)=0.5*Maximum(A11+A33; A12+A32; A13+A31; A21+A23).

Figure 9:
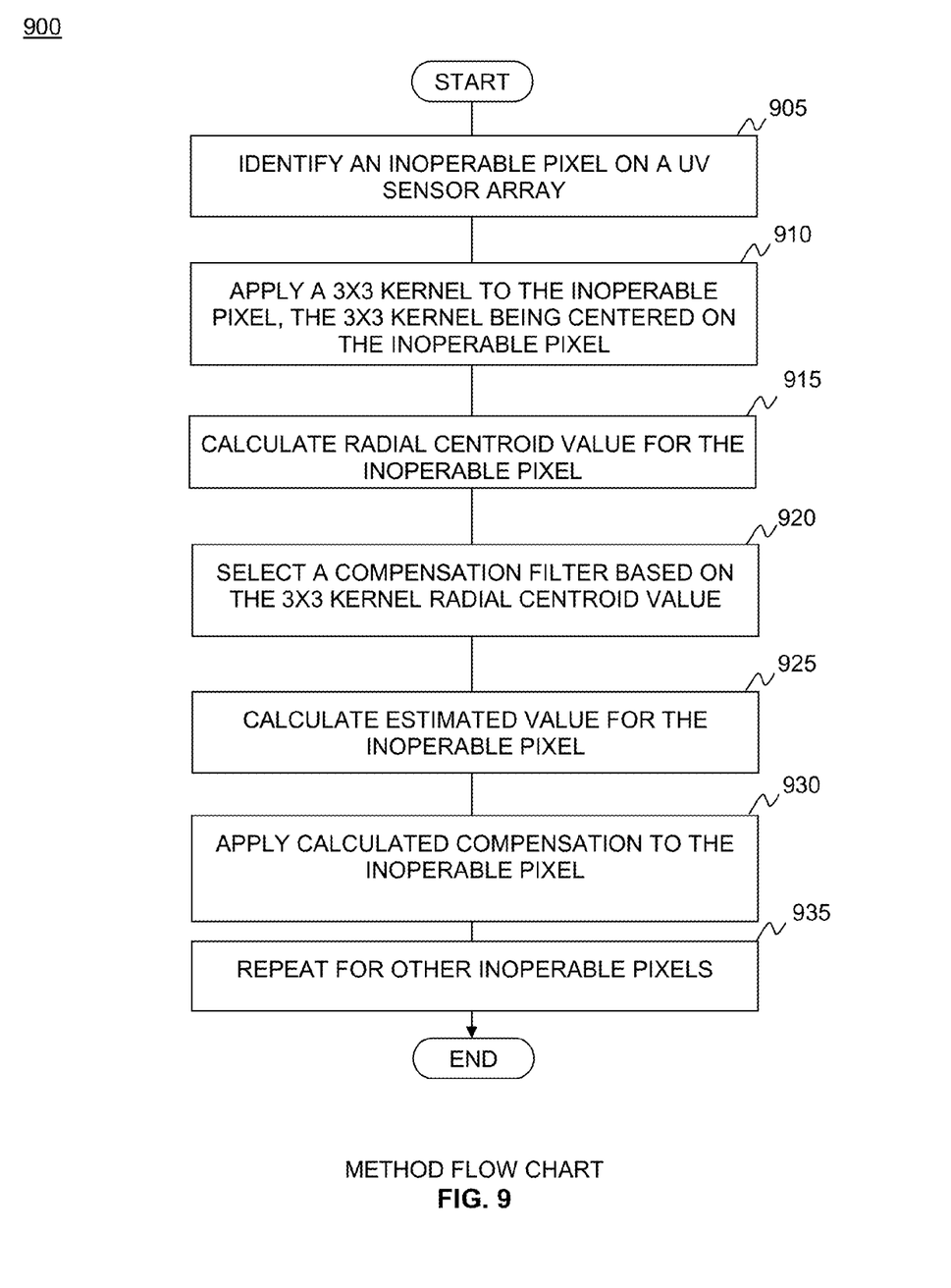
FIG. 9 is a method flow chart configured in accordance with one embodiment of the present invention.

FIG. 9 is a method flow chart 900. Steps comprise identifying an inoperable pixel on a UV sensor array having pixels 905; applying a 3×3 kernel to the inoperable pixel 910, the 3×3 kernel being centered on the inoperable pixel; calculating a centroid value for the inoperable pixel 915; selecting a compensation algorithm based on the 3×3 kernel centroid 920; calculating estimated value for the inoperable pixel 925; applying calculated compensation to the inoperable pixel 930; and repeating the algorithm for other inoperable pixels in the array 935.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for estimating values lost to inoperable pixels on an ultraviolet (UV) sensor array, the method comprising:
   identifying one said inoperable pixel on said ultraviolet (UV) sensor array having pixels;
   applying a kernel to said inoperable pixel;
   acquiring a centroid value for said inoperable pixel;
   applying a compensation algorithm to said kernel, wherein said compensation algorithm further comprises:
      applying a Guard Peak function multiplied by 1.1 to said kernel if the centroid value is between 0-0.1755;
      applying a Max(Corner) function to said kernel if the centroid value is between 0.1755-0.2351;
      applying a Max Kernel Slope (MSLP) function multiplied by 1.2 to said kernel if the centroid value is between 0.2351-0.4534;
      applying said MSLP function to said kernel if the centroid value is between 0.4534-0.6164;
      applying said MSLP multiplied by 0.75 to said kernel if the centroid value is between 0.6164-0.7637;
      applying said MSLP multiplied by 0.5 to said kernel if the centroid value is between 0.7637-0.8829;
      applying MSLP multiplied by 0.3 to said kernel if the centroid value is between 0.8829-0.9740; and
      applying a Median Filter to said kernel if the centroid value is greater than 0.9740, calculating estimated values for said inoperable pixel; and
   outputting said estimated value for said inoperable pixel with output of said UV sensor array.

2. The method of claim 1, wherein said compensation algorithm filter is based on said centroid value wherein said Centroid value equals a square root of ((CentroidX multiplied by CentroidX) plus (CentroidY multiplied by CentroidY));
   where CentroidX equals (a sum of (A13; A23; A33) minus a sum of (A11; A21; A31)) divided by a sum of (A13; A23; A33; A11; A21; A31); and
   where CentroidY equals (a sum of (A11; A12; A13) minus a sum of (A31; A32; A33)) divided by a sum of (A11; A12; A13; A31; A32; A33).

3. The method of claim 1, wherein dimensions of said kernel are three by three.

4. The method of claim 1, wherein said kernel is centered on said inoperable pixel.

5. The method of claim 2, comprising eight centroid value ranges.

6. The method of claim 5 wherein said eight centroid value ranges are about 0 to about 0.1755; about 0.1755 to about 0.2351; about 0.2351 to about 0.4534; about 0.4534 to about 0.6164; about 0.6164 to about 0.7637; about 0.7637 to about 0.8829; about 0.8829 to about 0.9740; and greater than about 0.9740.

7. The method of claim 1, wherein said Guard Peak function comprises selecting a largest value out of eight pixels in said Kernel inoperable pixel comprising (Maximum of (A11, A12, A13, A21, A23, A31, A32, A33)).

8. The method of claim 1, wherein said Median filter comprises calculating a median value out of eight pixels in said kernel comprising (Median of (A11, A12, A13, A21, A23, A31, A32, A33)).

9. The method of claim 1, wherein said Max Kernel Slope (MSLP) function selects a largest of an opposite kernel's pixel sums and applies half of a selected value as a result, wherein (MSLP equals one half times a Maximum of (A11+A33; A12+A32; A13+A31; A21+A23)).

10. The method of claim 1, wherein said Max Corner (MaxCrn) equals a maximum of an average of each corner pixel and each corner pixel's two adjacent pixels of said kernel, where MaxCrn equals Maximum of ((A21+A31+A32) divided by three; (A21+A11+A12) divided by three; (A12+A13+A23) divided by three; (A23+A33+A32) divided by three).

11. The method of claim 3, wherein said kernel comprises eight pixels surrounding an inoperable pixel.

12. The method of claim 1, wherein a value of said inoperable pixel is replaced with a value of zero if said kernel is positioned over pure noise, regardless of said centroid value.

13. A system for estimating values lost to inoperable pixels on an ultraviolet (UV) sensor array comprising:
   identifying at least one said inoperable pixel on said UV sensor array;
   applying a kernel to one of said at least one inoperable pixels;
   acquiring a centroid value for said one inoperable pixel;
   applying a compensation algorithm to said kernel, wherein said step of applying a compensation algorithm further comprises:

applying a Guard Peak function multiplied by 1.1 to said kernel if the centroid value is between 0-0.1755;

applying a Max(Corner) function to said kernel if the centroid value is between 0.1755-0.2351;

applying a Max Kernel Slope (MSLP) function multiplied by 1.2 to said kernel if the centroid value is between 0.2351-0.4534;

applying said MSLP function to said kernel if the centroid value is between 0.4534-0.6164;

applying said MSLP multiplied by 0.75 to said kernel if the centroid value is between 0.6164-0.7637;

applying said MSLP multiplied by 0.5 to said kernel if the centroid value is between 0.7637-0.8829;

applying MSLP multiplied by 0.3 to said kernel if the centroid value is between 0.8829-0.9740; and applying a Median Filter to said kernel if the centroid value is greater than 0.9740;

calculating an estimated value for said one inoperable pixel;

repeating said steps for subsequent inoperable pixels; and outputting said estimated value for said inoperable pixels with output of said UV sensor array, whereby added noise is reduced by a factor of four and random sources are prevented from appearing in output of said array.

14. The system of claim 13, wherein said kernel comprises a three by three block of eight pixels surrounding said inoperable pixel.

15. The system of claim 13, wherein said kernel is centered on said inoperable pixel.

16. The system of claim 13, wherein a value of said inoperable pixel is replaced with a value of zero if said kernel is positioned over pure noise, regardless of said centroid value.

17. The system of claim 13, wherein said compensation algorithm filter selection is based on one of eight centroid value ranges.

18. An ultraviolet (UV) sensor array system for estimating values lost to inoperable pixels comprising:

identifying one said inoperable pixel on said UV sensor array having pixels;

applying a 3×3 kernel to said inoperable pixel, said 3×3 kernel being centered on said inoperable pixel;

acquiring a centroid value for said inoperable pixel;

applying a compensation algorithm to said kernel, said compensation algorithm comprising:

applying a Guard Peak function multiplied by 1.1 to said kernel if the centroid value is between 0-0.1755;

applying a Max(Corner) function to said kernel if the centroid value is between 0.1755-0.2351, wherein MaxCrn function equals a maximum of an average of each corner pixel and each corner pixels two adjacent pixels of said kernel;

applying a Max Kernel Slope (MSLP) function multiplied by 1.2 to said kernel if the centroid value is between 0.2351-0.4534, wherein said MSLP function equals half of a maximum value of a sum of pixels and their opposites along said kernel;

applying said MSLP function to said kernel if the centroid value is between 0.4534-0.6164;

applying said MSLP multiplied by 0.75 to said kernel if the centroid value is between 0.6164-0.7637;

applying said MSLP multiplied by 0.5 to said kernel if the centroid value is between 0.7637-0.8829;

applying MSLP multiplied by 0.3 to said kernel if the centroid value is between 0.8829-0.9740; and applying a Median Filter to said kernel if the centroid value is greater than 0.9740;

calculating estimated values for said inoperable pixel; and outputting said estimated value for said inoperable pixel with output of said UV sensor array, whereby noise is reduced by a factor of four and random sources are prevented from appearing in output of said array.

* * * * *